United States Patent

[11] 3,547,283

| [72] | Inventors | James R. Beebe<br>Celina;<br>Paul A. Luthman, Maria Stein; Thomas R. Fischer, Wapakoneta, Ohio |
| --- | --- | --- |
| [21] | Appl. No. | 773,146 |
| [22] | Filed | Nov. 4, 1968 |
| [45] | Patented | Dec. 15, 1970 |
| [73] | Assignee | Avco Corporation<br>Coldwater, Ohio<br>a corporation of Delaware |

[54] DOUBLE AUGER SILO UNLOADER
1 Claim, 4 Drawing Figs.
[52] U.S. Cl. .................................................. 214/17
[51] Int. Cl. ...................................................... B65g 67/46
[50] Field of Search ........................................... 214/17(.84)

[56] References Cited
UNITED STATES PATENTS

| 3,143,378 | 8/1964 | James et al. ................. | 214/17(.84) |
| 3,301,412 | 1/1967 | Buschbom ..................... | 214/17(.84) |
| 3,451,566 | 6/1969 | Hanson ......................... | 214/17(.84) |

*Primary Examiner*—Robert G. Sheridan
*Attorney*—Charles M. Hogan

ABSTRACT: A silo unloader employing side-by-side rotating augers carried on a frame in radial rotation on the surface of silage to be unloaded from a circular silo, with such auger assembly serving to move silage radially inward to a central thrower. Structure and arrangement of the augers is such that the leading auger primarily digs and loosens silage material from the surface and also assists movement of the auger frame assembly around the silo while an adjacent following auger primarily moves material toward the center. The major portion of the silage is picked up from the following auger at the rear of the thrower opening, with the front of the thrower opening picking up a lesser amount.

PATENTED DEC 15 1970

INVENTORS.
JAMES R. BEEBE
PAUL A. LUTHMAN
THOMAS R. FISCHER

BY

ATTORNEYS.

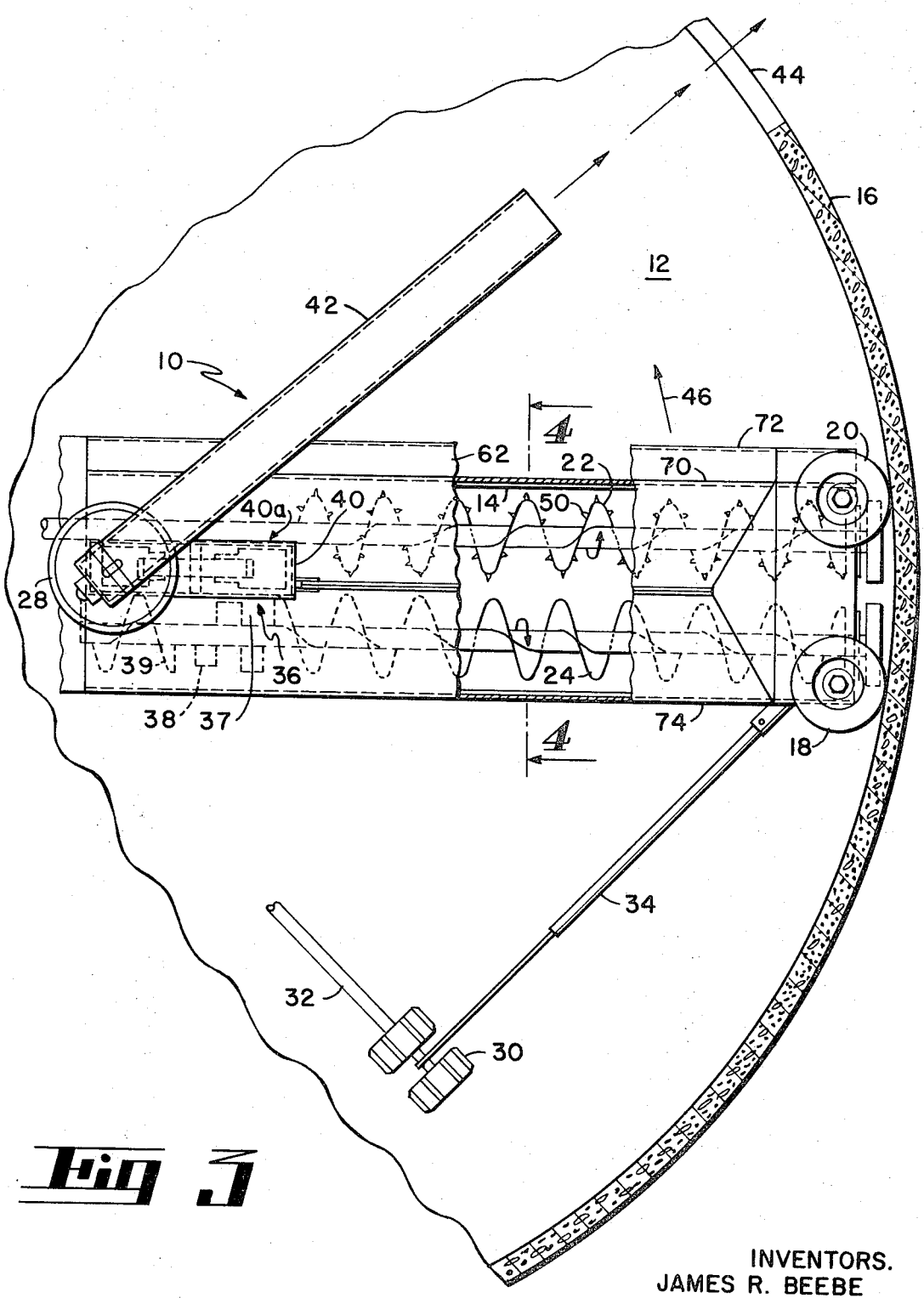

DOUBLE AUGER SILO UNLOADER

BACKGROUND OF THE INVENTION

In prior art structures of silo unloaders employing dual augers it has been common practice to rely heavily on both augers to both dig, loosen and move material toward the center. This requires a major transfer of material from the following auger to the front auger adjacent a centrally located thrower and such requirement decreases efficiency. The art has provided extensively developed dual augers positioned in a radially extending frame which is moved around the circular top surface of the silage. The rotating auger mechanism so carried accomplishes the function of separating the silage material from the surface during movement of the frame around the silo.

SUMMARY

A side-by-side counterrotating auger assembly is provided in which auger flights on the leading side of the assembly relative to movement around the silo, have spacedly positioned knifelike digger members secured to the outer edges of the auger flights, with the direction of rotation of the leading auger such that the contact of the projecting knifelike members with the surface of the silage during rotation assists the movement of the auger assembly in its rotation around the circular silage surface. The following auger has auger flights of preferably larger diameter than the auger flights of the leading auger with the direction of rotation opposite to that of the leading auger but without the digger knife projections thereon. Both of said augers although rotating in opposite directions have their auger flights of a configuration effective to move material toward the center of the silo. Auger flighting on the following auger is so constructed and arranged that it terminates at its inner end in a region rearward of and adjacent the downwardly-facing inlet to the thrower unit. The terminated following auger with the projections thereon has a shaft continuing inward adjacent the thrower inlet to move material into the thrower. The flighting on the leading auger terminates outwardly and to one side of the thrower inlet thus affording means whereby the movement of the assembly in its rotation around the silo results in a pick up of material through the front region of the thrower inlet.

DRAWINGS

FIG. 3 is a top view partly broken away depicting such an assembly with the location of the augers shown relative to the direction of rotation.

DESCRIPTION OF THE INVENTION

Figure 1:
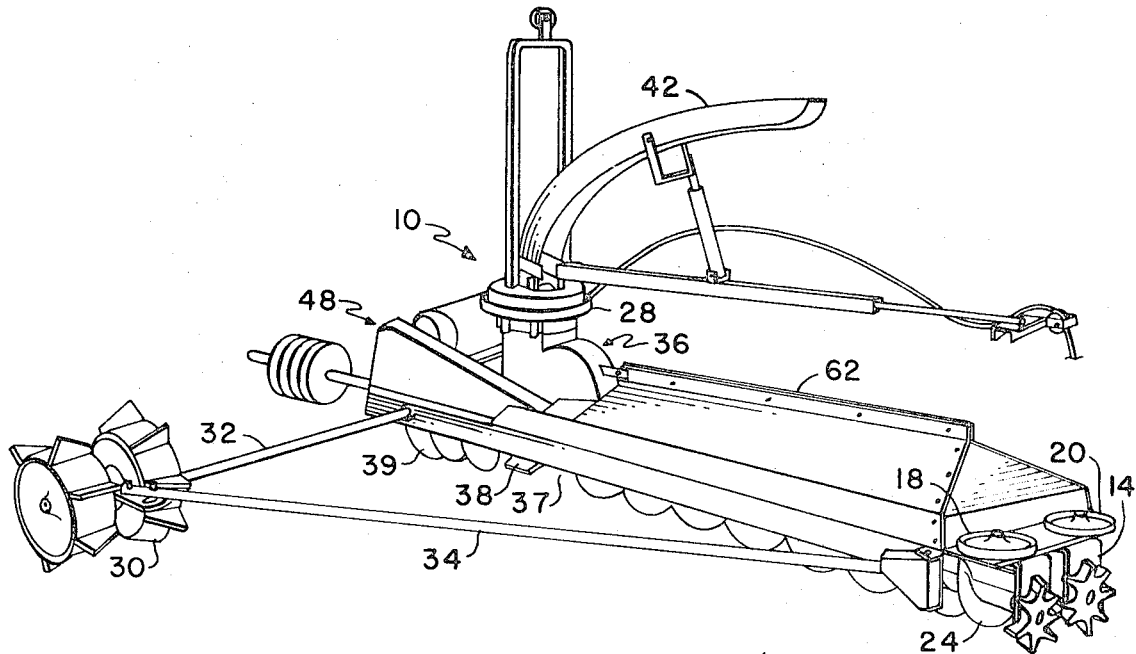
FIG. 1 is a perspective view of the silo unloader assembly, the view showing the trailing side of the assembly relative to its direction of rotation in the silo.
Figure 2:
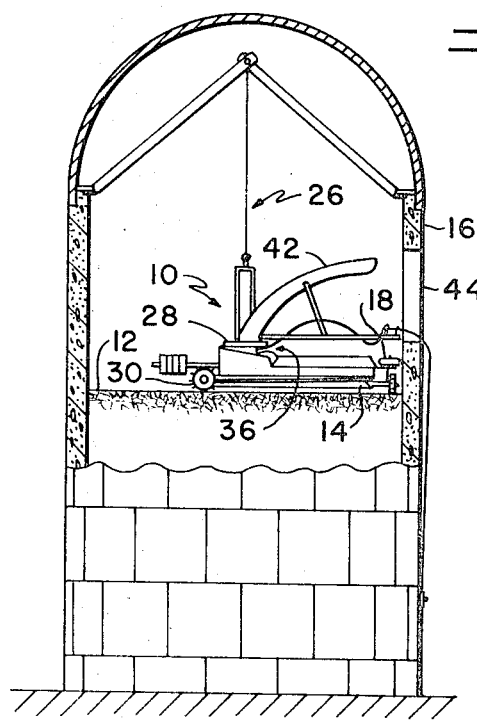
FIG. 2 is a vertical section through the center of a silo showing an illustrative silo unloader assembly in its position in the silo.
Figure 4:
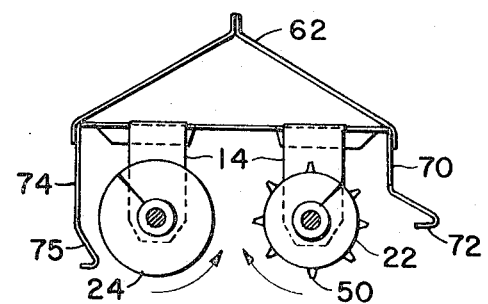
FIG. 4 is a sectional view taken on line 4—4 of FIG. 3.

Referring to the drawings, an unloader assembly 10, FIGS. 1 and 2, is suspended in the silo to rest on top circular surface 12 of the silage and includes a frame 14 radially extending from the center of the silo to the outside generally circular wall 16. The end of the assembly is guided around wall 16 by guide wheels 18, 20 and the frame 14 has mounted therein for rotation about longitudinal axes a front auger 22 and a rear auger 24. These augers are of the generally helical flight type and are provided with means to rotate them about their axes in directions shown by the arrows in FIGS. 3 and 4.

The entire assembly is located in the silo in a substantially radial relationship with the cylindrical inner surface of the silo and is so mounted on suspension cable unit 26 as to be movable by provision of a bearing member 28 so that the entire assembly 14 carrying the augers 22 and 24 is free to move in a continuing radial sweep around the silo on the surface 12 of the silage. A drive wheel 30 assists this movement and is shown mounted on shaft 32 and the outer end of which is connected to frame 14 by brace connection 34. At the inner end of the frame assembly 14 adjacent the center of the silo, a so-called thrower assembly 36, is provided. This thrower assembly includes rotatable impeller members forming a blower and impact unit for picking up silage which may be brought adjacent the downwardly opening inlet 40 of the thrower housing. The rotation of the impact members are such as to lift or blow material up to and through the spout 42 of the thrower, the spout 42 being continually held in a direction pointing toward a door opening 44 at the outside of the silo so that as the unloader assembly moves in a counterclockwise direction as shown in the drawings by the arrow 46, material separated from the surface of the silage by the augers is carried inward in position to be picked up by the thrower at the center and thrown out of the silo through the spout 42 and the door 44. The foregoing structure is generally well known in the art and need not be described in detail.

Important improvements in structure of the leading or forward auger 22 and the trailing or rearward auger 24 are important features of the combination of this invention. More specifically, the augers are connected to transmission mechanism 48 so that they rotate in opposite directions as shown by the arrows in FIGS. 3 and 4 and it will be noted that this direction of rotation is such that the leading or forward auger 22 in the counterclockwise direction of movement of the entire frame is such that projecting knife members 50, spacedly positioned and secured on the outer edges of the auger flights of auger 22, positively dig into the surface of the ensilage and by this contact dig the ensilage particles away from the surface. The force thus effected by the direction of rotation of the leading auger and the contact of the projections 50 on the ensilage assists drive wheel 30 in moving the frame assembly in the direction around the silo in a counterclockwise direction as shown by the arrow 46.

The adjacent rear auger 24, which is the rearward or trailing auger, has smooth-edged auger flights, free of projecting members. This auger moves loose silage material radially inward toward the center of the silo.

The relative diameter of the augers 22 and 24 are such that the trailing auger 24 has an outside diameter greater than the leading auger 22, insofar as the auger flights themselves are concerned. However, with the projections 50 on the auger 22 the overall diameter of the auger 50 is substantially the same as the overall diameter of the auger 24.

It will be noted that the auger flights on both augers 22 and 24 are so formed that although their direction of rotation is opposite their auger flight spiral relationship is such that both of them move material radially inwardly. The primary purpose of the leading auger 22 is to remove ensilage material by contact of its projections 50 while the primary purpose of the trailing auger 24 is to move the material dislodged by the leading auger in a radially inward direction. Pickup efficiency is increased by the fact that, since the assembly is moving around the silo simultaneously with the dislodgment of silage by the projections on auger 22, the dislodged material is immediately moved closely adjacent the working surfaces of the trailing auger 24 for ready movement inwardly toward the center of the silo.

Referring to FIG. 3 it will be noted that the auger flighting on the leading auger 22 terminates just short of the downwardly facing opening or inlet 40 of the thrower housing 36 while the auger flighting on the trailing auger 24 extends farther into the side and closely adjacent such opening and at the region 37 rearwardly of the opening as the frame moves around the silo. Secured to the auger shaft in this region are paddle members 38 designed to throw ensilage material toward the inlet opening 40 of the thrower 36. There is also a short region of auger flight 39 on the opposite side of the paddles 38 which is so spirally constructed in its flight design as to move material outwardly in a direction toward the paddles 38. This accommodates material which may have been moved too far inwardly of region 38.

The outer panel 62 covering the top of the unloader is formed as a triangular section relative to the front and rear frame members whereby strength advantage to the frame assembly is obtained. The downwardly extending front panel portion 70 has a projection 72 near the bottom adjacent the silage which acts as a safety bumper. The rear panel 74 is provided at its lower edges with a shield 75 positioned closely adjacent the rear of the following auger 24. This serves as a wiper adjacent the outer edges of the auger flights and thereby helps movement of silage material along the auger during operation.

In operation and referring particularly to the top view, FIG. 3, the frame assembly 14 carrying the leading front auger 22 and the following rear auger 24 together with the thrower assembly 36 (except the spout 42 which remains stationary and throws silage out the door opening 44 of the silo), moves in a counterclockwise direction around the silo with the augers contacting the surface of the silage. The drive wheel 30 obtains traction upon the silage. The leading auger 22 by reason of its direction of movement and the action of the knifelike projections 50 thereon materially assists the movement of the frame assembly 14 in its movement around the silo and takes a large proportion of the drive load from the drive wheel 30. This assures that there is an equalization of drive and a distribution of drive, tending to give a positive and uniform motion of the frame assembly. As movement of the frame proceeds the leading auger 22 with its knifelike projections 50 digs material from the surface of the silage and material thus dislodged is almost immediately gathered by the following auger 24. The following auger thus carries inwardly that portion of the material which is not moved inward by the smaller diameter auger flights of the auger 22. This contact of material by the following auger and with its smooth uninterrupted and larger diameter assures positive movement of the major portion of the material inward toward the center.

It will be observed that the rear panel 74 which is positioned close to the following auger and extends downward to the surface of the silage aids in positively moving silage inwardly toward the center and toward the paddles 38. When material reaches this point the paddle assembly 38 moves it into the downwardly facing outlet opening 40 of the thrower.

The panel members 74 and 75 are adjacent the entrance to the thrower and to the rear thereof. The short region 39 of the auger flights which extends beyond the paddle assembly moves material also into the auger but from a direction close to the center of the rotation of the frame. Because of the fact that the frame is moving in a counterclockwise direction, any material which is not moved by the paddle assembly into the rear thrower inlet will be left on the surface of the silage adjacent the paddles and behind the paddles as the frame assembly moves in its counterclockwise direction. This material will remain on the surface of the silage and will be picked up by the forward region of opening 40 as it moves around the silo. Accordingly, the forward face of housing 36 is left open as indicated at 40a in FIG. 3 to assure the accomplishment of this function.

The leading auger 22 terminates short of the thrower opening and does not extend beside the forward thrower inlet while the rear auger does extend a greater distance inward and is adjacent the rear thrower inlet. The open space left between the inner end of the leading auger 22 assures that there will be an open space 40a left clear for pick up from the front thrower opening to gather any material left by the operating of the paddles at the rear.

It will thus be observed that there is no transfer of material from one auger to the other adjacent the thrower opening but this function is accomplished by the fact that the front thrower opening picks up any material left by the rear paddle assembly in the subsequent pass of the front inlet after about almost a 360° rotation of the assembly.

While there has been shown and described what is at present considered to be the preferred embodiment of the invention, it will be understood by those skilled in the art that various changes and modifications may be made therein.

We claim:
1. In a silo unloader of the type having a radially extending auger frame movable as a unit for rotation on the surface of material in said silo and a thrower assembly carried by said auger frame adjacent the center of the silo for receiving material carried toward said thrower, said thrower having a leading and trailing inlet for receiving material, the improvement comprising:
   a first auger journaled in said frame and extending radially inward to said thrower assembly for rotation on a longitudinal axis in a direction which assists rotation of said auger frame around the surface of the material in said silo, said first auger having flights with projections thereon for digging material from the surface of said silo;
   a second auger journaled in said frame for rotation in trailing relation and parallel to said first auger, said second auger having auger flights with smooth edges for primarily moving material toward the central portion of said frame for subsequent removal by said thrower, said second auger having a paddle radially inward from said flights and adjacent the trailing side of said thrower for throwing material delivered by said auger to the thrower and a portion of auger flight extending radially inward from said paddle for moving material toward said paddle from the central portion of said auger frame; and
   a housing surrounding the upper portion of said auger frame and having a trailing panel positioned close to the second auger and extending downward to the surface of the material so that it positively assists the second auger in moving material radially inward toward said thrower, said housing further having a leading panel positioned adjacent the first auger and spaced sufficiently from the surface of the material in said silo for permitting said thrower to pick up loose material directly from the surface of said silo as said auger frame rotates on said surface.